United States Patent [19]

Akimoto et al.

[11] Patent Number: 4,709,268
[45] Date of Patent: Nov. 24, 1987

[54] AUTOMATIC FREQUENCY PULLING CIRCUIT

[75] Inventors: Taizo Akimoto, Minamiashigara; Masahiko Kawai, Tokyo, both of Japan

[73] Assignees: Fuji Photo Film Co., Ltd.; Ikegami Tsushinki Co., Ltd., both of Japan

[21] Appl. No.: 890,230

[22] Filed: Jul. 29, 1986

[30] Foreign Application Priority Data

Jul. 29, 1985 [JP] Japan .................... 60-167292
Jul. 29, 1985 [JP] Japan .................... 60-167293

[51] Int. Cl.$^4$ ............................. H04N 5/06
[52] U.S. Cl. .................... 358/150; 358/148; 358/158
[58] Field of Search .......... 358/148, 150, 158; 331/1 R, 18, 20, 25

[56] References Cited

U.S. PATENT DOCUMENTS 4,520,394 5/1985 Kaneko .................... 358/158

Primary Examiner—James J. Groody
Assistant Examiner—Michael D. Parker
Attorney, Agent, or Firm—Sughrue, Mion, Zinn, Macpeak, and Seas

[57] ABSTRACT

An automatic frequency pulling circuit produces a signal in synchronism with a horizontal synchronizing signal from a video signal processing device or the like. The automatic frequency pulling circuit comprises an equalizing pulse remover responsive to a synchronizing signal separated from a composite video signal for alternately removing equalizing pulses therefrom, and a PLL circuit composed of at least a phase comparator and a voltage-controlled oscillator. The phase comparator is arranged to compare the phases of an output from the equalizing pulse remover and an output from the voltage-controlled oscillator, for thereby producing the signal in synchronism with the horizontal synchronizing signal. The signal thus generated is utilized in a video monitor, for example, to display accurate images thereon.

6 Claims, 3 Drawing Figures

AUTOMATIC FREQUENCY PULLING CIRCUIT

BACKGROUND OF THE INVENTION

The present invention relates to an automatic frequency pulling circuit, and more particularly to an automatic frequency pulling circuit capable of producing a signal in synchronism with a horizontal synchronizing signal from a video signal processing device.

Composite video signals produced from video signal processing devices such as CT scanners include a vertical synchronizing signal with serrated pulses inserted at ½H intervals. If such serrated pulses were not inserted or were out of proper timing, a video image displayed on a video monitor in response to a composite video signal from the video signal processing device would be disturbed. With the interlacing scanning system, scanning lines in even fields would not be positioned midway between scanning lines in odd fields, resulting in poor quality of displayed images.

There is known an image recording apparatus in which video signals from a video signal processing device used for diagnosis of diseases are displayed on a video monitor and displayed images are photographed. If serrated pulses were not present or were not in proper timing, the recorded images would be disturbed and fail to represent accurate information of the patent, leading to a wrong diagnosis.

In the above image recording apparatus, raster erasure is generally carried out to make image scanning lines less visible by inserting new scanning lines between the image scanning lines on the video monitor. However, such scanning lines used for raster erasure would not be inserted at equal intervals if no serrated pulses were present or serrated pulses were not properly timed.

SUMMARY OF THE INVENTION

It is a general object of the present invention to provide an automatic frequency pulling circuit capable of generating a signal in phase synchronism with a horizontal synchronizing signal in a composite video signal for displaying accurate images.

Another object of the present invention is to provide an automatic frequency pulling circuit comprising an equalizing pulse remover responsive to a synchronizing signal separated from a composite video signal for alternately removing equalizing pulses therefrom to produce a horizontal synchronizing signal, and a PLL circuit composed of at least a phase comparator and a voltage-controlled oscillator, the phase comparator being arranged to compare the phases of an output from the equalizing pulse remover and an output from the voltage-controlled osillator.

Still another object of the present invention is to provide an automatic frequency pulling circuit further including a frequency-to-voltage converter for converting the frequency of the output from the equalizing pulse remover to a voltage, which is applied as a control signal to the equalizing pulse remover to control the same.

A still further object of the present invention is to provide an automatic frequency pulling circuit further including an amplifier for amplifying an output from the phase comparator and applying an amplified output as a control signal to the voltage-controlled oscillator.

Yet another object of the present invention is to provide an automatic frequency pulling circuit wherein the output from the equalizing pulse remover is applied as an input to the frequency-to-voltage converter, and an output from the frequency-to-voltage converter is applied as an input to the amplifier.

A yet further object of the present invention is to provide an automatic frequency pulling circuit further including first and second gate means controlled by a vertical synchronizing signal separated from the composite video signal, the output supplied from the equalizing pulse remover through the first gate means and the output supplied from the voltage-controlled oscillator through the second gate means being compared in phase by the phase comparator.

Still another object of the present invention is to provide an automatic frequency pulling circuit further including a frequency-to-voltage converter for converting the frequency of the output from the equalizing pulse remover to a voltage, which is applied as a control signal to the equalizing pulse remover to control the same, the output from the frequency-to-voltage converter being applied as a control signal to the voltage-controlled oscillator.

A still further object of the present invention is to provide an automatic frequency pulling circuit wherein the equalizing pulse remover comprises a monostable multivibrator for producing an output having a pulse-topulse interval greater than ½H and smaller than 1H.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
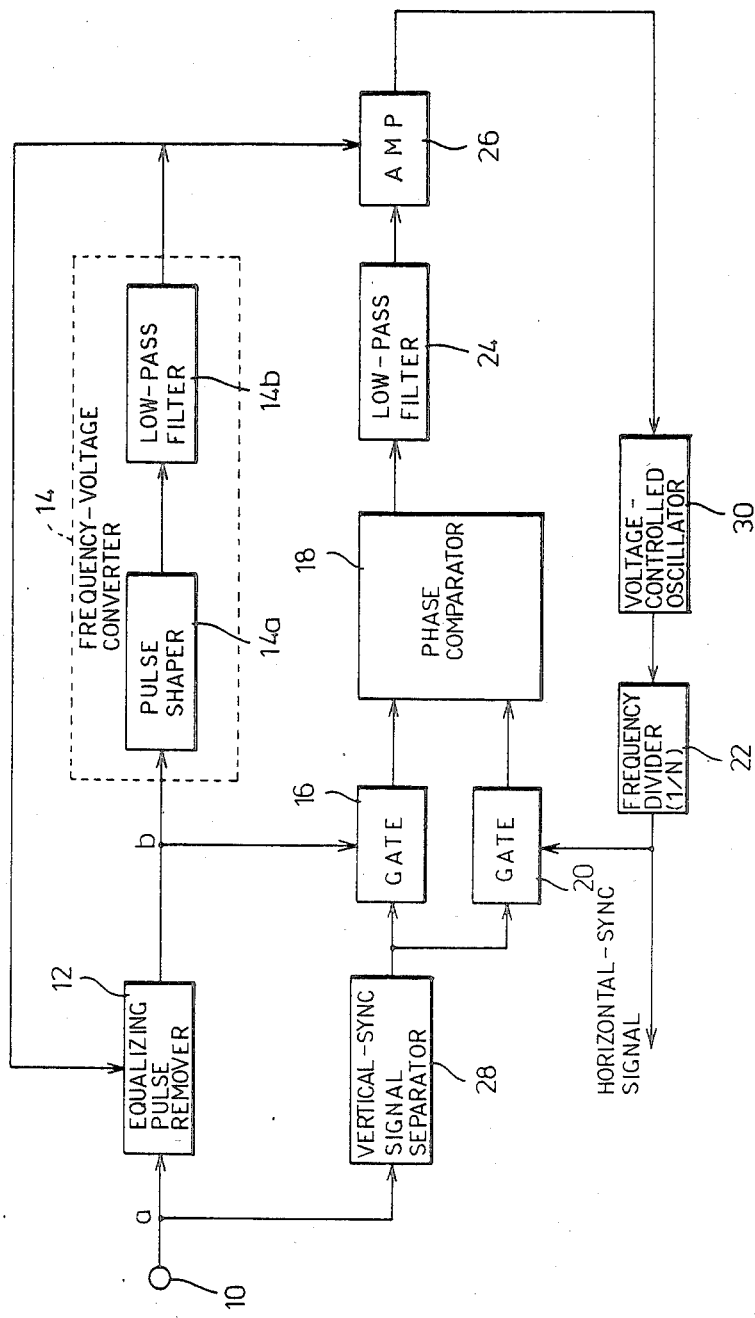
FIG. 1 is a block diagram of an automatic frequency pulling circuit according to the present invention.

As shown in FIG. 1, synchronizing signals separated from a composite video signal fed from a CT scanner, for example, are supplied to an input terminal 10. The synchronizing signals are then delivered to an equalizing pulse remover 12 comprising a monostable multivibrator. The monostable multivibrator is arranged to produce a pulse signal having a pulse-to-pulse interval of ¾H in response to a trigger signal applied thereto. The pulse-to-pulse interval is selected to be ¾H because any equalizing pulse would not be positionally shifted beyond a value between 1H and ½H.

The output from the equalizing pulse remover 12 is supplied to a frequency-to-voltage converter 14, which converts it to a voltage. The voltage produced by the frequency-to-voltage converter 14 is fed back to the monostable multivibrator of the equalizing pulse remover 12 to control the time constant of the monostable multivibrator for controlling the pulse-to-pulse interval at ¾H. The frequency-to-voltage converter 14 comprises a pulse shaper 14a energizable by the output pulses from the equalizing pulse remover 12 and a low-pass filter 14b for smoothing out an output from the pulse shaper 14a.

The output from the equalizing pulse remover 12 is also supplied through a first gate 16 to a phase comparator 18, which compares it with an output from a frequency divider 22 (described later). An output from the phase comparator 18 is delivered via a low-pass filter 24 to an amplifier 26, and amplified thereby. The output voltage from the frequency-to-voltage converter 14 is supplied to the amplifier 26 to give an offset signal to the amplified output from the amplifier 26.

The output from the amplifier 26 is supplied to a voltage-controlled oscillator 30, whose output is then fed to the frequency divider 22. An output from the frequency divider 22 is supplied as a horizontal synchronizing signal to the horizontal deflection circuit of a video monitor (not shown) for triggering the same. The voltage-controlled oscillator 30 has a self-running oscillation frequency set to Nfh.

The synchronizing signals applied to the input terminal 10 are supplied to a vertical synchronizing signal separator 28, which separates a vertical synchronizing signal from the supplied synchronizing signals. The separated vertical synchronizing signal is supplied to the gate 16 and another gate 20 for closing these gates 16, 20.

The synchronizing signals applied to the input terminal 10 are of a waveform as shown in FIG. 2(a). The monostable multivibrator of the eqlizing pulse remover 12 is triggered by negative-going edges of the synchronizing signals of FIG. 2(a) to remove equalizing pulses and serrated pulses inserted at ½H. The output pulses from the equalizing pulse remover 12 has a period of 1H as shwon in FIG. 2(b). This is because the pulse-to-pulse interval of the output pulses produced by the equalizing pulse remover 12, i.e., the monostable multivibrator, is selected to be ¾H. Even if the equalizing pulses and/or serrated pulses are positionally shifted, every other equalizing and serrated pulses are removed unless they are positionally shifted beyond a period from ½H to ¾H.

The pulse shaper 14a produces output pulses as shown in FIG. 2(c) in response to the output from the equalizing pulse remover 12. The output from the low-pass filter 14b, i.e., the frequency-to-voltage converter 14, is as shown in FIG. 2(d). Since the output signal from the frequency-to-voltage converter 14 is fed back to the equalizing pulse remover 12, the frequency of the output from the equalizing pulse remover 12 is controlled to maintain the pulse-to-pulse interval of ¾H.

The vertical synchronizing signal separator 28 separates a vertical synchronizing signal as illustrated in FIG. 2(e) from the synchronizing signal applied to the input terminal 10. The gates 16, 20 are open outside of the period of the vertical synchronizing signal (the period of low level in FIG. 2(e)), for thereby allowing the phase comparator 18 to compare the phases of the outputs from the eqlizing pulse remover 12 and the frequency divider 22. The output from the phase comparator 18, as shown in FIG. 2(f), is smoothed out by the low-pass filter 24, whose output is illustrated in FIG. 2(g). During the period of the vertical synchronizing signal, the gates 16, 20 are closed to cut off the inputs to the phase comparator 18. Therefore, the phase comparator 18 keeps, as its output, the output value immediately before its inputs are cut off.

The smoothed output from the low-pass filter 24 is amplified by the amplifier 26 to which the output voltage from the frequency-to-voltage converter 14 is applied. As a consequence, the output from the amplifier 26 is offset dependent on the output voltage from the frequency-to-voltage converter 14, i.e., the frequency of the synchronizing signal applied to the input terminal 10, and is corrected by the output of the low-pass filter 24. Therefore, the response to the horizontal synchronizing signal is improved. Since the output voltage from the amplifier 26 is applied to the voltage-controlled oscillator 30, the output frequency of the voltage-controlled oscillator 30 is also a function of the frequency of the synchronizing signal applied to the input terminal 10, and is corrected by the phase difference between the inputs applied to the phase comparator 18, with the result that the output of the frequency Nfh (FIG. 2(h)) is produced from the voltage-controlled oscillator 30. The reference character fh indicates the frequency of the horizontal synchronizing signal in the synchronizing signal supplied to the input terminal 10.

Figure 2:
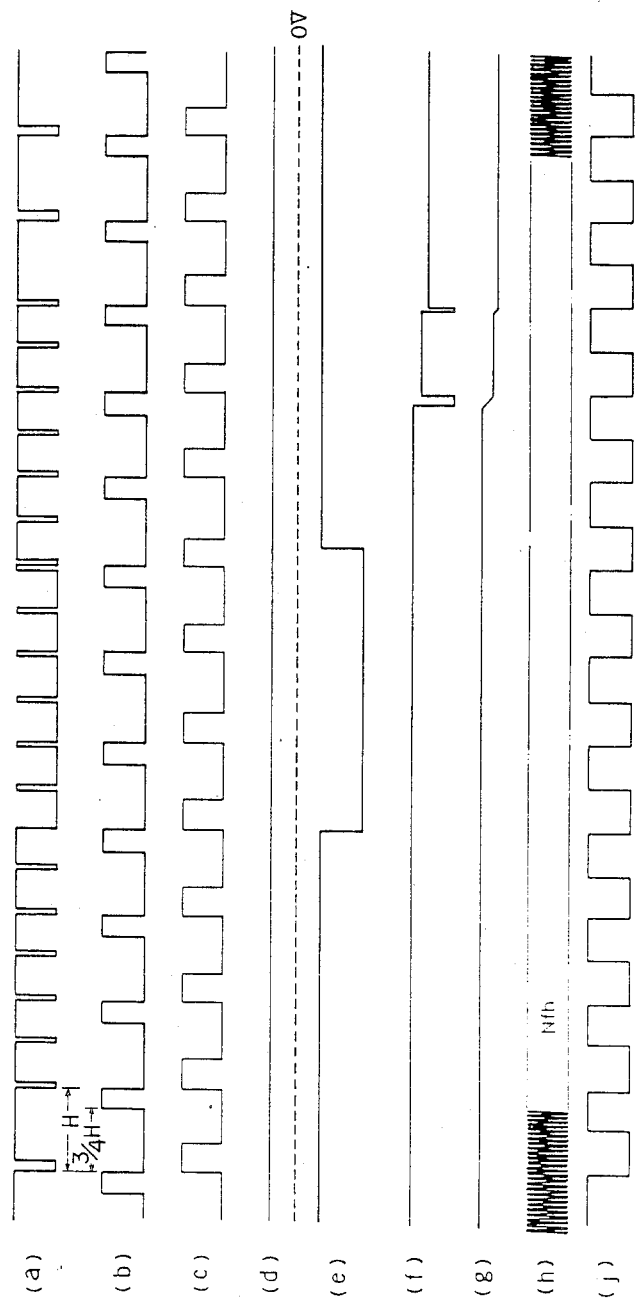
FIGS. 2 and 3 are waveform diagrams explanatory of operation of the automatic frequency pulling circuit of the invention.
Figure 3:
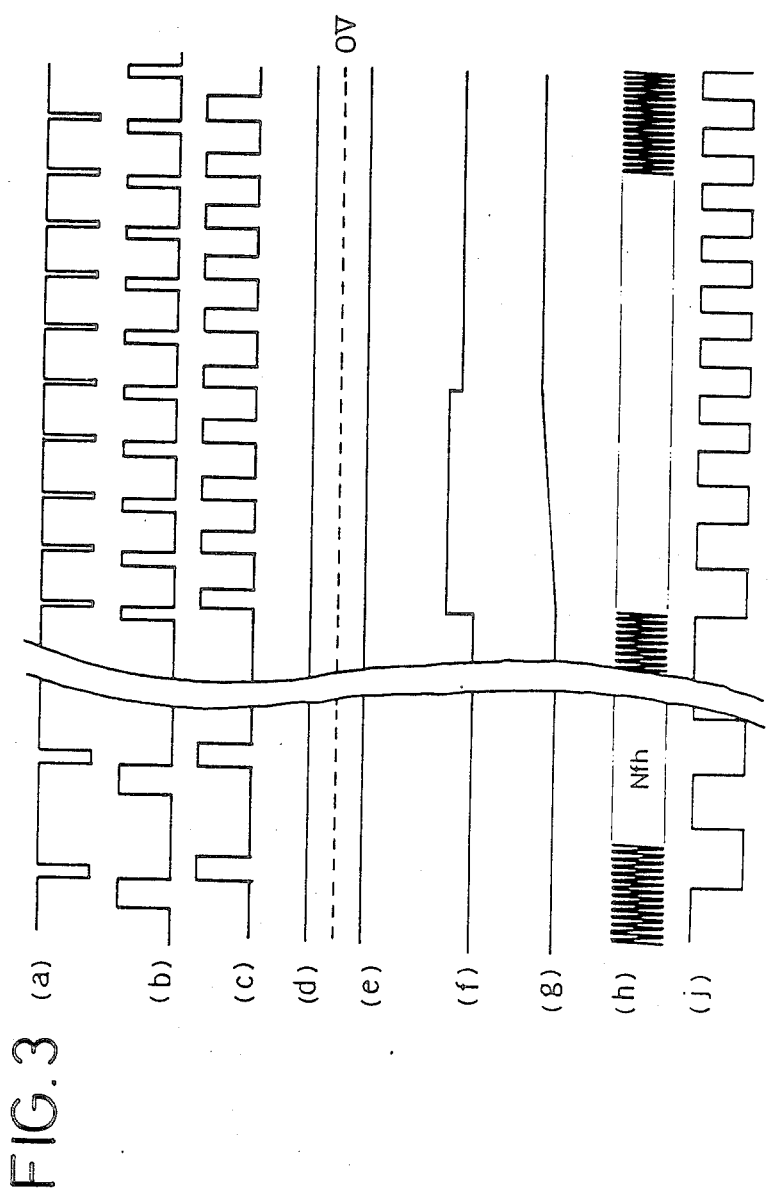

The output frequency from the voltage-controlled oscillator 30 is divided by N. Consequently, the frequency divider 22 produces a signal as shown in FIG. 2(j) which is in phase synchronism with the horizontal synchronizing signal in the synchronizing signals supplied to the input terminal 10. FIG. 3 shows signal waveforms produced when the frequency of the horizontal synchronizing signal in the synchronizing signal supplied to the input terminal 10 is higher than that shown in FIG. 2.

With the arrangement of the invention, as described above, unwanted equalizing pulses are removed in response to a synchronizing signal separated from a composite video signal, and there is provided a PLL circuit which is supplied with a signal from which the undesired equalizing pulses have been removed, so that a signal can be generated in phase synchronism with the signal free from the equalizing pulses. The signal in phase synchronism with the signal free from the equalizing pulses can be used as a horizontal synchronizing signal. Inasmuch as the output of an amplifier of the PLL circuit is offset by the output from a frequency-to-voltage converter, the response to the horizontal synchronizing signal can be increased.

Since the input synchronizing signal in the vertical synchronizing signal is cut off by gate means, displayed images will not be disturbed even if there are no serrated pulses or serrated pulses are generated out of proper timing.

Although a certain preferred embodiment has been shown and described, it should be understood that many changes and modifications may be made therein without departing from the scope of the appended claims.

What is claimed is:

1. An automatic frequency pulling circuit comprising;
    an equalizing pulse remover responsive to a synchronizing signal separated from a composite video signal for alternately removing equalizing pulses therefrom to produce a horizontal synchronizing signal;
    a PLL circuit composed of at least a phase comparator and a voltage-controlled oscillator, said phase comparator being arranged to compare the phases of an output from said equalizing pulse remover and an output from said voltage-controlled oscillator; and
    a frequency-to-voltage converter for converting the frequency of the output from said equalizing pulse remover to a voltage, which is applied as a control signal to said equalizing pulse remover to control the same.

2. An automatic frequency pulling circuit according to claim 2, further including
an amplifier for amplifying an output from said phase comparator and applying an amplified output as a control signal to said voltage-controlled oscillator.

3. An automatic frequency pulling circuit according to claim 2, wherein said frequency-to-voltage converter applies an output thereof as an input to said amplifier.

4. An automatic frequency pulling circuit comprising;
an equalizing pulse remover responsive to a synchronizing signal separated from a composite video signal for alternately removing equalizing pulses therefrom to produce a horizontal synchronizing signal;
a PLL circuit composed of at least a phase comparator and a voltage-controlled oscillator, said phase comparator being arranged to compare the phases of an output from said equalizing pulse remover and an output from said voltage-controlled oscillator; and
first and second gate means controlled by a vertical synchronizing signal separated from said composite video signal, the output supplied from said equalizing pulse remover through said first gate means and the output supplied from said voltage-controlled oscillator through said second gate means being compared in phase by said phase comparator.

5. An automatic frequency pulling circuit according to claim 4, further including a frequency-to-voltage converter for converting the frequency of the output from said equalizing pulse remover to a voltage, which is applied as a control signal to said equalizing pulse remover to control the same, the output from said frequency-to-voltage converter being applied as a control signal to said voltage-controlled oscillator.

6. An automatic frequency pulling circuit according to claim 1, wherein said equalizing pulse remover comprises a monostable multivibrator for producing an output having a pulse-to-pulse interval greater than $\frac{1}{2}$H and smaller than 1H.

* * * * *